(12) United States Patent
Barnes et al.

(10) Patent No.: US 10,144,863 B2
(45) Date of Patent: Dec. 4, 2018

(54) METHOD FOR PREDICTING THE OPTIMAL SALINITY OF INTERNAL OLEFIN SULFONATE COMPOSITIONS

(71) Applicant: SHELL OIL COMPANY, Houston, TX (US)

(72) Inventors: Julian Richard Barnes, Amsterdam (NL); Hendrik Dirkswager, Harde (NL); Carmen Geraldine Reznik, Friendswood, TX (US); Sonja Geib, Amsterdam (NL); Sjoerd Reindert Van Kuijk, Amsterdam (NL); James Laurel Buechele, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/313,152

(22) PCT Filed: May 21, 2015

(86) PCT No.: PCT/US2015/031921
§ 371 (c)(1),
(2) Date: Nov. 22, 2016

(87) PCT Pub. No.: WO2015/179611
PCT Pub. Date: Nov. 26, 2015

(65) Prior Publication Data
US 2017/0183559 A1    Jun. 29, 2017

Related U.S. Application Data

(60) Provisional application No. 62/002,430, filed on May 23, 2014.

(51) Int. Cl.
*C09K 8/584* (2006.01)
*G06F 17/11* (2006.01)

(52) U.S. Cl.
CPC ............. *C09K 8/584* (2013.01); *G06F 17/11* (2013.01)

(58) Field of Classification Search
CPC .......... C09K 8/584; C09K 8/588; C09K 8/58; C09K 8/594; C09K 8/68; C09K 8/602; C09K 8/52; C09K 8/88; C09K 2208/10; C09K 8/592; C09K 8/94; C09K 2208/28; C09K 8/032; C09K 8/882; C09K 2208/20; C09K 2208/22; C09K 2208/32; C09K 8/00; C09K 8/035; C09K 8/12; C09K 8/24; C09K 8/38; C09K 8/70; C09K 8/703; C09K 8/74; C09K 8/86; E21B 43/26; E21B 43/20; E21B 43/16; E21B 41/00; E21B 43/166; E21B 21/14; E21B 37/06; E21B 43/121; E21B 43/162; E21B 43/168; E21B 43/2406; E21B 43/2408; E21B 43/243; E21B 47/00

See application file for complete search history.

(56) References Cited

U.S. PATENT DOCUMENTS

| | | |
|---|---|---|
| 3,467,190 A | 9/1969 | Dunlap |
| 4,183,867 A | 1/1980 | Sekiguchi et al. |
| 4,248,793 A | 2/1981 | Sekiguchi et al. |
| 4,330,418 A * | 5/1982 | Glinsmann ............ C09K 8/584 |
| | | 166/275 |
| 4,488,976 A | 12/1984 | Dilgren et al. |
| 4,537,253 A | 8/1985 | Morita et al. |
| 4,597,879 A | 7/1986 | Morita et al. |
| 4,979,564 A | 12/1990 | Kalpakci et al. |
| 5,068,043 A | 11/1991 | Thigpen et al. |
| 5,510,306 A | 4/1996 | Murray |
| 5,633,422 A | 5/1997 | Murray |
| 5,648,584 A | 7/1997 | Murray |
| 5,648,585 A | 7/1997 | Murray et al. |
| 5,849,960 A | 12/1998 | Singleton et al. |
| 2013/0190543 A1* | 7/2013 | Barnes .................. C09K 8/584 |
| | | 585/4 |

FOREIGN PATENT DOCUMENTS

| | | |
|---|---|---|
| EP | 0351928 | 1/1990 |
| EP | 0830315 | 9/1999 |
| WO | 2011100301 | 8/2011 |

OTHER PUBLICATIONS

Anton et al.; "Effect of the Electrolyte Anion on the Salinity Contribution to Optimm Formulation of Anionic Surfactant Microemulsions"; Journal of Colloid and Interface Science; vol. 140, No. 1; pp. 75-81; Nov. 1990.

Barnes et al.; "Application of Internal Olefin Sulfonates and Other Surfactants to EOR. Part 1: Structure-Performance Relationships for Selection at Different Reservoir Conditions"; SPE 129766; 2010 SPE Improved Oil Recovery Symposium in Tulsa, OK; 16 pages; Apr. 24-28, 2010.

Barnes et al.; "Field Test of Cosurfactant-Enhanced Alkaline Flooding"; SPE Reservoir Engineering; Aug. 1994.

Barnes et al.; "Development of Surfactants for Chemical Flooding at Difficult Reservoir Conditions"; SPE Improved Oil Recovery Symposium; Tulsa, OK; Apr. 19-23, 2008.

Chatzis et al.; "Correlation of Capillary Number Relationships for Sandstone"; SPE of AIME; 8 pages; Oct. 1984.

(Continued)

*Primary Examiner* — Kumar R Bhushan

(57) ABSTRACT

The present invention provides a method for predicting the optimal salinity of individual members of a class of internal olefin sulfonate compositions in a mixture containing the individual member, a brine and hydrocarbons, wherein the internal olefin sulfonate compositions comprise a mixture containing hydroxy alkane sulfonates and alkene sulfonates. The invention further provides use of the weight ratio of hydroxy alkane sulfonates to alkene sulfonates in an internal olefin sulfonate composition to predict the optimal salinity of the surfactant composition in a mixture of the surfactant composition, a brine and an oil.

15 Claims, 3 Drawing Sheets

(56) References Cited

OTHER PUBLICATIONS

Stache; "Anionic Surfactants Organic Chemistry"; ISBN 0-8247-9394; Chapter 7; 99 pages 1995.
Tenside Detergents; "Why Internal Olefins are difficult to Sulphonate"; vol. 22, No. 4; pp. 193-195; 1985.

* cited by examiner

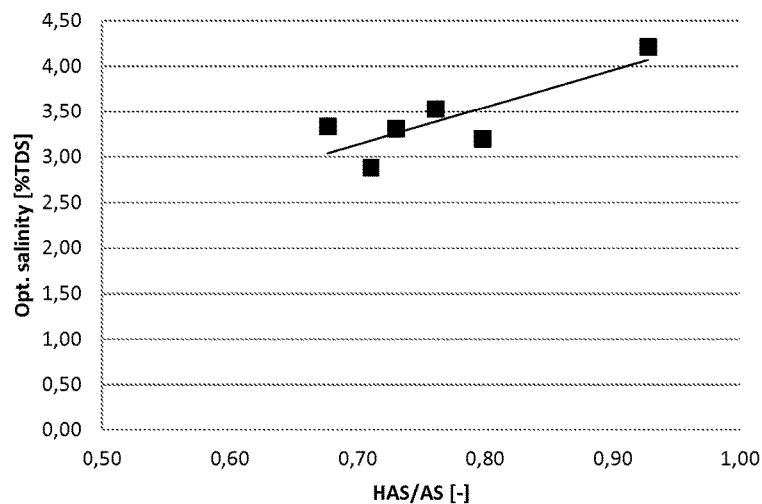
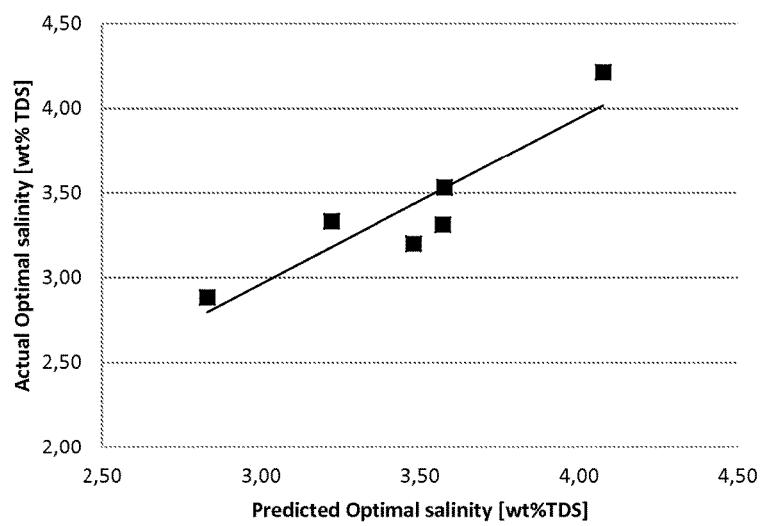

METHOD FOR PREDICTING THE OPTIMAL SALINITY OF INTERNAL OLEFIN SULFONATE COMPOSITIONS

PRIORITY CLAIM

The present application is the National Stage (§ 371) of International Application No. PCT/US2015/031921, filed May 21, 2015, which claims priority from U.S. Patent Application No. 62/002,430, filed May 23, 2014 incorporated herein by reference.

REFERENCE TO RELATED APPLICATIONS

The present application claims priority to U.S. Provisional Application No. 62/002,430, filed on May 23, 2014.

FIELD OF THE INVENTION

The present invention relates to a method for predicting the optimal salinity of internal olefin sulfonate compositions and the use of the hydroxy alkane sulfonate to alkene sulfonate weight ratio to predict optimal salinity.

BACKGROUND OF THE INVENTION

Hydrocarbons may be recovered from hydrocarbon-bearing formations by penetrating the formation with one or more wells. Hydrocarbons may flow to the surface through the wells. Conditions (e.g. permeability, hydrocarbon concentration, porosity, temperature, pressure, amongst others) of the hydrocarbon containing formation may affect the economic viability of hydrocarbon production from the hydrocarbon containing formation. A hydrocarbon-bearing formation may have natural energy (e.g. gas, water) to aid in mobilizing hydrocarbons to the surface of the hydrocarbon containing formation. Natural energy may be in the form of water. Water may exert pressure to mobilize hydrocarbons to one or more production wells. Gas may be present in the hydrocarbon-bearing formation (reservoir) at sufficient pressures to mobilize hydrocarbons to one or more production wells. The natural energy source may become depleted over time. Supplemental recovery processes may be used to continue recovery of hydrocarbons from the hydrocarbon containing formation. Examples of supplemental processes include waterflooding, polymer flooding, alkali flooding, thermal processes, solution flooding or combinations thereof.

In chemical enhanced oil recovery (cEOR) the mobilization of residual oil saturation is achieved through surfactants which generate a sufficiently (ultra) low crude oil/water interfacial tension (IFT) to give a capillary number large enough to overcome capillary forces and allow the oil to flow (I. Chatzis and N. R. Morrows, "Correlation of capillary number relationship for sandstone". SPE Journal, Vol. 29, pp 555-562, (1989).

Compositions and methods for enhanced hydrocarbons recovery utilizing an alpha olefin sulfonate-containing surfactant component are known. U.S. Pat. Nos. 4,488,976 and 4,537,253 describe enhanced oil or recovery compositions containing such a component. Compositions and methods for enhanced hydrocarbons recovery utilizing internal olefin sulfonates are also known. Such a surfactant composition is described in U.S. Pat. No. 4,597,879.

U.S. Pat. No. 4,979,564 describes the use of internal olefin sulfonates in a method for enhanced oil recovery using low tension viscous water flooding. An example of a commercially available material described as being useful was ENORDET IOS 1720, a product of Shell Oil Company identified as a sulfonated $C_{17-20}$ internal olefin sodium salt. This material has a low degree of branching. U.S. Pat. No. 5,068,043 describes a petroleum acid soap-containing surfactant system for waterflooding wherein a cosurfactant comprising a $C_{17-20}$ or a $C_{20-24}$ internal olefin sulfonate was used. In "Field Test of Cosurfactant-enhanced Alkaline Flooding" by Falls et al., Society of Petroleum Engineers Reservoir Engineering, 1994, the authors describe the use of internal olefin sulfonates in a waterflooding composition.

Barnes, et al. (SPE-129766-PP "Application of Internal Olefin Sulfonates and Other Surfactants to EOR. Part 1: Structure—Performance Relationships for Selection at Different Reservoir Conditions", SPE Improved Oil Recovery Symposium, Tulsa, Okla., USA, 24-28 Apr. 2010) reported on the use of internal olefin sulfonate (IOS), in particular IOS 19-23 and IOS 20-24, based surfactant systems for chemical enhanced oil recovery applications showing the different optimal salinity for the several surfactant systems with different oil compositions. According to Barnes et al., optimal salinity is the salinity of the water phase provided to the reservoir, whereby equal amounts of oil and water are solubilized in a microemulsion. Barnes et al., refer to Winsor having first described microemulsion phase behavior as type I (oil in water), type II (water in oil) and type III (bicontinuous oil/water phase also known as a middle phase microemulsion). For anionic surfactants, increasing salinity causes a transition from Winsor type I to type III to type II. Optimal salinity is defined where equal amounts of oil and water are solubilized in the middle phase (Winsor type III) microemulsion. The method principle is to measure the volumes of water, oil and any emulsion phases at a particular test temperature as salinity is increased causing a transition in phase behavior from Winsor type I to type III to type II. The data from these phases are plotted against salinity and give oil and water solubilization parameters. At the optimal salinity an ultra low oil/water interfacial tension is attained where capillary forces are lowest which enables the "residual oil" trapped in the rock to be mobilized.

Determination of the optimal salinity of a mixture of surfactant, oil and brine is an essential step in providing the appropriate surfactant system for a particular crude oil reservoir. The salinity of the brine is often set by the availability of the brine at the location of the reservoir. For instance when sea water is used as the brine at an off-shore location there are little means to economically change the salinity of the seawater. Therefore, the focus is on selecting a surfactant system that can provide a Winsor III type micro-emulsion in combination with the available brine and crude oil. However, till now the process for determining the optimal salinity of a surfactant system with available brine and crude oil is predominantly based on trial and error, including the expensive and time consuming procedure of producing surfactants with a different optimal salinity.

There is a need in the art for a method to predict optimal salinity for a surfactant system and a particular crude oil in a crude oil reservoir.

SUMMARY OF THE INVENTION

It has now been found that the weight ratio of hydroxy alkane sulfonates to alkene sulfonates in the internal olefin sulfonate composition that is used as a surfactant in chemical Enhanced Oil Recovery (further referred to as cEOR) is related to the optimal salinity of a mixture comprising the surfactant, oil and brine. It has furthermore been found that by changing the weight ratio of hydroxy alkane sulfonates to alkene sulfonates in the internal olefin sulfonate composition the salinity at which the surfactant will contribute to the formation of a Winsor III type micro-emulsion can be changed. In addition it has been found that the optimal salinity of a specific surfactant in a mixture containing the surfactant, a brine and an oil can be predicted on the basis of two or more reference surfactants that belong to the same general class of surfactants, but having a different weight ratio of hydroxy alkane sulfonates (HAS) to alkene sulfonates (AS) in the internal olefin sulfonate composition.

Accordingly, the present invention provides a method for predicting the optimal salinity of individual members of a class of internal olefin sulfonate compositions in a mixture containing the individual member, a brine and hydrocarbons, wherein the internal olefin sulfonate compositions comprise a mixture containing hydroxy alkane sulfonates and alkene sulfonates, the method including:
(a) determining the correlation between a weight ratio of hydroxy alkane sulfonates to alkene sulfonates of the individual members and separately the optimal salinity of individual members in a mixture containing the individual member, a brine and the hydrocarbons on the basis of two or more reference members of the class of internal olefin sulfonate compositions, each reference member having a different known weight ratio of hydroxy alkane sulfonates to alkene sulfonates; and
(b) using the correlation to predict:
  b1) the optimal salinity of a further member of the class of internal olefin sulfonate compositions, which further member contains a weight ratio of hydroxy alkane sulfonates to alkene sulfonates different from the reference members; or
  b2) the required weight ratio of hydroxy alkane sulfonates to alkene sulfonates of an individual member at which weight ratio of hydroxy alkane sulfonates to alkene sulfonates the presence of the individual member in a mixture of the individual member, a brine and hydrocarbons, of which the salinity of the mixture is known, may result in a microemulsion with bicontinuous hydrocarbons and water phases,
wherein the correlation is characterized by an function:

$$OS = f(x), \quad (I)$$

wherein: OS=optimal salinity [wt % total dissolved solids or equivalent wt % NaCl];
x=weight ratio of hydroxy alkane sulfonates to alkene sulfonates [–].

Reference herein to a class of internal olefin sulfonate compositions is to internal olefin sulfonate compositions that have been prepared using the same sulfonation process and prepared from the same internal olefin comprising feedstock. Reference herein to "using the same sulfonation process" is to the use of a particular sulfonation process, wherein the process parameters may be varied within the normally acceptable boundaries. Reference herein in to internal olefin comprising feedstocks that are the same is to internal olefin feedstocks of which it may normally be expected that the use of such feedstocks in a sulfonation process under the same process conditions would result in similar internal olefin sulfonate compositions.

Reference herein to individual members of a class of internal olefin sulfonate compositions is to internal olefin sulfonate compositions prepared using the same sulfonation process and prepared from the same internal olefin feedstock, each having at least a different weight ratio of hydroxy alkane sulfonates to alkene sulfonates (further also referred to as the HAS/AS ratio) in the internal olefin sulfonate composition.

Reference herein to the optimal salinity of individual members of a class of internal olefin sulfonate compositions is to the salinity of a mixture containing the individual member, i.e. the internal olefin sulfonate composition, a brine and hydrocarbons, wherein the presence of the internal olefin sulfonate composition results in a microemulsion with bicontinuous hydrocarbons and water phases also referred to a Winsor type III micro-emulsion. The salinity herein may be expressed as the total dissolved solids content in wt % (wt % total dissolved solids or wt % TDS) of the brine. It is equally possible to express the salinity on the basis of equivalent wt % of NaCl. The latter expression takes into account that not all salts in the brine contribute equally compared to the reference salt NaCl. Such difference may be caused by the molar ratio of e.g. anions and cations in the salt, the differences in molecular weight of the salts and whether a complete dissociation of the salt occurs, i.e. an incomplete dissociation may result in a lower effective sodium ion concentration in the brine. Anton et al. (Anton and Salager in "Effect of the Electrolyte Anion on the Salinity Contribution to Optimum Formulation of Anionic Surfactant Microemulsions", J. Colloid and Interface Science, Vol. 140, 1 Nov. 1990), incorporated herein by reference, provides a guidance to determine the equivalent NaCl concentration (equivalent wt % NaCl based on the brine) for salts other than NaCl. The method according to the present invention may be used to determine the correlation between the optimal salinity and the HAS/AS ratio irrespective of whether the optimal salinity is expressed in wt % TDS or equivalent wt % NaCl, as long as a single expression is adhered to when working the method according to the invention. Alternative ways of expressing the salinity may also be used. For all practical matters it is preferred to express the salinity in wt % TDS.

Reference herein to a correlation is to a mathematical representations. The correlation between a HAS/AS ratio and the optimal salinity of individual members allows for the prediction of the optimal salinity of an individual member on the basis of a known HAS/AS ratio of that individual member, or the prediction of the required HAS/AS ratio of an individual member at which the presence of the individual member composition in a mixture of the individual member, a brine and hydrocarbons may result in a Winsor type III micro-emulsion if the salinity of the mixture is known.

An advantage of the method according to the invention is that on the basis of a limited number of reference samples the optimal salinity of an internal olefin sulfonate composition having a specific HAS/AS ratio may be predicted.

A further advantage is that that on the basis of a limited number of reference samples the appropriate HAS/AS ratio of an internal olefin sulfonate composition may be predicted for use in a chemical EOR application where the salinity of the brine, and preferably the complete mixture of the internal olefin sulfonate composition, the brine and hydrocarbons, is known.

BRIEF DESCRIPTION OF THE DRAWINGS

FIG. 5 depicts a graphical representation of the correlation between the optimal salinity and HAS/AS for $C_{24-28}$ internal olefin sulfonates, wherein the hydrocarbons are provided in the form of crude oil.

FIG. 6 depicts a graphical representation of the actual optimal salinity versus the predicted optimal salinity using the correlation according to the invention for $C_{24-28}$ internal olefin sulfonates, wherein the hydrocarbons are provided in the form of crude oil.

Figure 1:
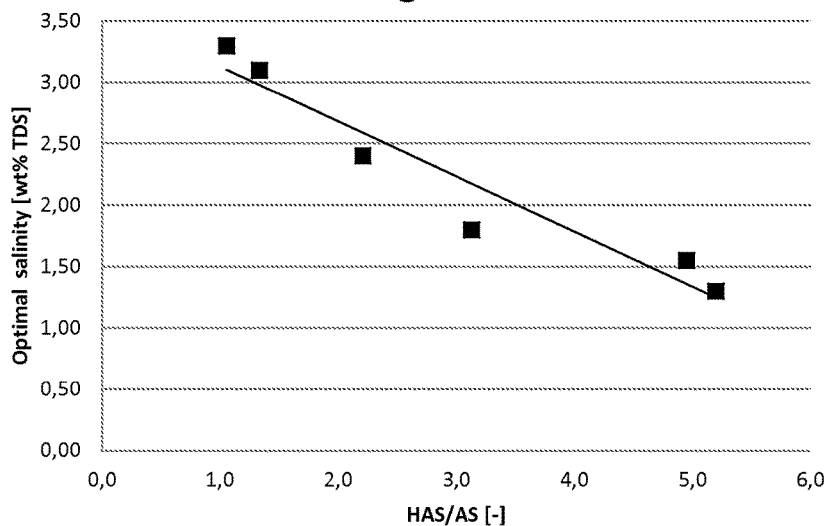
FIG. 1 depicts a graphical representation of the correlation between the optimal salinity and HAS/AS for $C_{20-24}$ internal olefin sulfonates, wherein the hydrocarbons are provided in the form of octane.

While the invention is susceptible to various modifications and alternative forms, specific embodiments thereof are shown by way of example in the drawings and will herein be described in detail. It should be understood that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Hydrocarbons may be produced from hydrocarbon formations through wells penetrating a hydrocarbon containing formation. "Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen and/or sulfur. Hydrocarbons derived from a hydrocarbon formation may include, but are not limited to, kerogen, bitumen, pyrobitumen, asphaltenes, resins, saturates, naphthenic acids, oils or combinations thereof. There hydrocarbon are herein also referred to as the oil. Hydrocarbons may be located within or adjacent to mineral matrices within the earth. Matrices may include, but are not limited to, sedimentary rock, sands, silicilytes, carbonates, diatomites and other porous media.

As hydrocarbons are produced from a hydrocarbon containing formation, pressures and/or temperatures within the formation may decline. Various forms of artificial lift (e.g., pumps, gas injection) and/or heating may be employed to continue to produce hydrocarbons from the hydrocarbon containing formation. Production of desired hydrocarbons from the hydrocarbon containing formation may become uneconomical as hydrocarbons are depleted from the formation.

As production rates decrease, additional methods may be employed to make a hydrocarbon containing formation more economically viable. Methods may include adding sources of water (e.g., brine, steam), gases, polymers, monomers or any combinations thereof to the hydrocarbon formation to increase mobilization of hydrocarbons.

In chemically enhanced oil recovery (cEOR) applications, surface active compounds are provided to the reservoir to improve mobilization of the hydrocarbons. A class of surface active compounds, or surfactants, that is particularly suitable for cEOR application are internal olefin sulfonates.

Internal olefin sulfonates are chemically suitable for EOR because they have a low tendency to form ordered structures/liquid crystals (which can be a major issue because long range ordered molecular structuring tends to dramatically increase fluid viscosities and can to lead decreased mobility of fluids within the hydrocarbon formations, and reduced recoveries) because they are a complex mixture of surfactants with different chain lengths. Internal olefin sulfonates show a low tendency to adsorb on reservoir rock surfaces arising from negative-negative charge repulsion between the surface and the surfactant.

In this application, "Average carbon number" as used herein is determined by multiplying the number of carbon atoms of each internal olefin sulfonate in the mixture of internal olefin sulfonates by the mole percent of that internal olefin sulfonate and then adding the products.

"Internal olefin sulfonate composition" as used herein means a sulfonate produced by the sulfonation of an internal olefin. The sulfonate may include mono sulfonates, disulfonates and higher sulfonates. The internal olefin sulfonate composition comprises alkene sulfonates and hydroxy alkane sulfonates.

"hydroxy alkane sulfonates" as used herein includes hydroxy alkane sulfonates, hydroxy alkene sulfonates hydroxy di-alkene sulfonates, but excludes any di-sulfonate species.

"alkene sulfonates" as used herein includes mono-alkene sulfonates and di-alkene sulfonates, but excludes any di-sulfonate species and hydroxy alkane sulfonates, as defined above.

"$C_{19-23}$ internal olefin sulfonate" as used herein means a composition comprising a mixture of internal olefin sulfonates wherein the mixture has an average carbon number of from about 19.5 to about 23 and at least 50% by weight, preferably at least 60% by weight, of the internal olefin sulfonates in the mixture contain from 19 to 23 carbon atoms.

"$C_{20-24}$ internal olefin sulfonate" as used herein means a composition comprising a mixture of internal olefin sulfonates wherein the mixture has an average carbon number of from about 20.0 to about 23 and at least 50% by weight, preferably at least 65% by weight, most preferably at least 75% by weight, of the internal olefin sulfonates in the mixture contain from 20 to 24 carbon atoms.

"$C_{24-28}$ internal olefin sulfonate" as used herein means a composition comprising a mixture of internal olefin sulfonates wherein the mixture has an average carbon number of from 24.5 to 29 and at least 40% by weight, preferably at least 50% by weight, most preferably at least 60% by weight, of the internal olefin sulfonates in the blend contain from 24 to 28 carbon atoms.

As mentioned before internal olefin sulfonate compositions are particularly suitable to be used as surfactants in cEOR applications. The internal olefin sulfonates, optionally together with other components in a hydrocarbon recovery composition, may interact with hydrocarbons in at least a portion of a hydrocarbon containing formation. Interaction with the hydrocarbons may reduce interfacial tension of the hydrocarbons with one or more fluids in the hydrocarbon containing formation. Typically, the process of treating a crude oil containing formation in a cEOR application comprises admixing at least an internal olefin sulfonate composition with water and/or brine, and then injecting the injectable fluid into the formation where it mixes with the hydrocarbons in the formation, i.e. the crude oil. The interactions between the internal olefin sulfonates and the hydrocarbons in the hydrocarbon containing formation have been described in for instance WO2011/100301, which is incorporated herein by reference.

In cEOR, one of the functions of the internal olefin sulfonates compositions is to reduce the interfacial tension between an aqueous phase and a hydrocarbon phase to induce the formation of a microemulsion that can be retrieved from the reservoir.

As described by Barnes, et al. (SPE-129766-PP "Application of Internal Olefin Sulfonates and Other Surfactants to EOR. Part 1: Structure—Performance Relationships for Selection at Different Reservoir Conditions", SPE Improved Oil Recovery Symposium, Tulsa, Okla., USA, 24-28 Apr. 2010), the microemulsion phase behavior of a mixture comprising the internal olefin sulfonates compositions, a brine and oil, i.e. hydrocarbons, may be characterized as Winsor type I: an oil in water emulsion, Winsor type II: a water in oil emulsion and Winsor type III: a bicontinuous oil/water phase also known as a middle phase microemulsion. For an improved cEOR performance it is preferred that a Winsor type III microemulsion is formed. For anionic surfactants, like internal olefin sulfonates, increasing salinity causes a transition from Winsor type I to type III to type II. Optimally, equal amounts of oil and water are solubilized in a Winsor type III microemulsion. The brine salinity at which a specific internal olefin sulfonate composition induces the formation of a Winsor type III microemulsion in a mixture comprising the internal olefin sulfonate composition, a brine and a specific oil is referred to as the optimal salinity of the internal olefin sulfonate composition.

Until now the optimal salinity of a specific internal olefin sulfonate composition has been determined by trial and error using phase behavior tests. The method according to the present invention allows for the prediction of the optimal salinity of an internal olefin sulfonate composition by correlating the optimal salinity to the HAS/AS ratio of the internal olefin sulfonate composition. Preferably, the HAS/AS ratio is determined on the basis of mono sulfonates.

The internal olefin sulfonate composition comprises hydroxy alkane sulfonates and alkene sulfonates, preferably the majority based on weight of the components (excluding water) in the internal olefin sulfonate composition are hydroxy alkane sulfonates and alkene sulfonates. These sulfonate compounds are typically formed during the sulfonation of internal olefins as part of the process for producing the internal olefin sulfonate composition. The HAS/AS ratio in an internal olefin sulfonate composition can be varied by varying the process parameters of the sulfonation process within the normally acceptable boundaries of these type of processes.

It has been found that by changing the HAS/AS ratio the optimal salinity of the internal olefin sulfonate composition changes. Furthermore, it has been found that it is possible to correlate the optimal salinity of internal olefin sulfonate composition to it's HAS/AS ratio on the basis of the optimal salinity and HAS/AS ratio determined for two or more reference samples.

In the method according to the invention the optimal salinity of individual members of a class of internal olefin sulfonate compositions in a mixture containing the individual member, a brine and hydrocarbons is predicted for internal olefin sulfonate compositions that comprise a mixture containing hydroxy alkane sulfonates and alkene sulfonates.

The class of internal olefin sulfonate compositions comprises individually members, which members are internal olefin sulfonate compositions having at least different weight ratios of hydroxy alkane sulfonates to alkene sulfonates. Preferably the internal olefin sulfonate compositions have been prepared from the same internal olefin comprising feedstock. Due to the nature of the internal olefin sulfonation process, two or more batches of internal olefin sulfonate composition will inherently show some minor compositional differences. Preferably, where the class of internal olefin sulfonate compositions comprises individually members, which members are internal olefin sulfonate compositions having different weight ratios of hydroxy alkane sulfonates to alkene sulfonates, and the members have been prepared from two or more internal olefin comprising feedstocks, it is preferred that each of the two or more internal olefin comprising feedstocks comprise a mixture of internal olefins. Furthermore, the difference between the average carbon number of the internal olefins calculated on the basis of all of the two or more internal olefin feedstocks and the average carbon number of the internal olefins of each individual internal olefin comprising feedstock is not more than 2, preferably not more than 1.

In addition where two or more internal olefin comprising feedstocks containing branched olefins are used, it is preferred that for the two or more internal olefin comprising feedstocks (a) the overall average content of branched olefins, i.e. calculated on the basis of all of the two or more internal olefin feedstocks; and (b) the average content of branched olefins of each individual internal olefin comprising feedstock do not differ by more than 40 wt %, preferably more than 20 wt %, more preferably more than 10 wt %, even more preferably more than 5 wt %. The average content of branched olefins herein is defined as the wt % of branched olefins based on the whole of the internal olefin feedstock(s).

The method according to the invention is particularly suitably and preferably used for a class of internal olefin sulfonate compositions comprising individually members, which members are internal olefin sulfonate compositions comprising a mixture of internal olefin sulfonates wherein the mixture has an average carbon number in the range of from 12 to 32, preferably of from 15 to 30.

One suitable class of internal olefin sulfonate compositions comprises individually members, which members are internal olefin sulfonate compositions comprising a mixture of internal olefin sulfonates wherein the mixture has an average carbon number in the range of from 19.5 to 23. A particularly preferred class of internal olefin sulfonate compositions of this type is a "C19-23 internal olefin sulfonate", which is a composition comprising a mixture of internal olefin sulfonates wherein the mixture has an average carbon number of from about 19.5 to about 23 and at least 50% by weight, preferably at least 60% by weight, of the internal olefin sulfonates in the mixture contain from 19 to 23 carbon atoms.

Another suitable class of internal olefin sulfonate compositions comprises individually members, which members are internal olefin sulfonate compositions comprising a mixture of internal olefin sulfonates wherein the mixture has an average carbon number in the range of from 20.0 to 23. A particularly preferred class of internal olefin sulfonate compositions of this type is a "$C_{20-24}$ internal olefin sulfonate", which is a composition comprising a mixture of internal olefin sulfonates wherein the mixture has an average carbon number of from about 20.0 to about 23 and at least 50% by weight, preferably at least 65% by weight, most preferably at least 75% by weight, of the internal olefin sulfonates in the mixture contain from 20 to 24 carbon atoms.

A further suitable class of internal olefin sulfonate compositions comprises individually members, which members are internal olefin sulfonate compositions comprising a mixture of internal olefin sulfonates wherein the mixture has an average carbon number in the range of from 24.5 to 29. A particularly preferred class of internal olefin sulfonate compositions of this type is a "$C_{24-28}$ internal olefin sulfonate" which is a composition comprising a mixture of internal olefin sulfonates wherein the mixture has an average carbon number of from 24.5 to 29 and at least 40% by weight, preferably at least 50% by weight, most preferably at least 60% by weight, of the internal olefin sulfonates in the blend contain from 24 to 28 carbon atoms.

The method according to the invention includes in a first step, the determination of the correlation between a weight ratio of hydroxy alkane sulfonates to alkene sulfonates of the individual members and separately the optimal salinity of individual members in a mixture containing the individual member, a brine and the hydrocarbons on the basis of two or more reference members of the class of internal olefin sulfonate compositions. The reference members herein are internal olefin sulfonate compositions for which the optimal salinity and HAS/AS ratio have been analyzed. By choosing at least two reference members that each have a different known weight ratio of hydroxy alkane sulfonates to alkene sulfonates it is possible to determine the correlation. In more detail the determination of the correlation may be done by:
i) preparing a first reference member with a first weight ratio of hydroxy alkane sulfonates to alkene sulfonates;
ii) determining an optimal salinity of the first reference member in a first mixture containing the first reference member, a first brine and the oil by changing the salinity of the first brine;
iii) preparing a second reference member with a second weight ratio of hydroxy alkane sulfonates to alkene sulfonates, which second weight ratio is different from the first weight ratio of hydroxy alkane sulfonates to alkene sulfonates;
iv) determining an optimal salinity of the second reference member in a second mixture containing the second reference member, a second brine and the oil by changing the salinity of the second brine; and
v) correlating the optimal salinities of the first and second reference members to the first and second weight ratio of hydroxy alkane sulfonates to alkene sulfonates.

Preferably, in steps ii) and iv) the optimal salinity is determined by changing the salinity of the brine until a Winsor type III microemulsion is obtained.

Increasing the number of reference members used benefits the determination of the correlation. Therefore, it is preferred that steps (iii) and (iv) are repeated one or more times using further reference members with different further weight ratios of hydroxy alkane sulfonates, and using the optimal salinities of the further reference members and the further weight ratios of hydroxy alkane sulfonates to alkene sulfonates in step (v) for determining the correlation.

The correlation used in the method according to the invention provides the optimal salinity (OS) as a function of the weight ratio of hydroxy alkane sulfonates to alkene sulfonates (x) and can be characterized by a function:

$$OS=f(x), \quad (I)$$

wherein: OS=optimal salinity [wt %];
x=weight ratio of hydroxy alkane sulfonates to alkene sulfonates [–].

Although, in the method according to the present invention the correlation provides the optimal salinity (OS) as a function of the weight ratio of hydroxy alkane sulfonates to alkene sulfonates, the correlation could equally be represented as to provide the weight ratio of hydroxy alkane sulfonates to alkene sulfonates (x) as a function of the optimal salinity (OS) characterized by an function:

$$x=f(OS), \quad (II)$$

wherein: OS=optimal salinity [wt % TDS or equivalent wt % NaCl];
x=weight ratio of hydroxy alkane sulfonates to alkene sulfonates [–].

Both above described representations of the correlation are considered to be part of the invention.

The correlation may be, but is not limited to, linear, exponential or logarithmic. A particularly suitable correlation is a linear correlation characterized by a linear function:

$$OS=ax+b, \quad (III)$$

wherein:
OS=optimal salinity [wt % TDS or equivalent wt % NaCl];
x=weight ratio of hydroxy alkane sulfonates to alkene sulfonates feed [–];
$-5<a<5$, preferably $-3<a<3$, more preferably $-2<a<2$; and
$-7<b<7$, preferably $-5<b<5$.

The coefficient a, herein, may be positive or negative depending on the nature of the internal olefin sulfonate composition, but is preferably not zero.

Having determined the correlation between the optimal salinity and the HAS/AS ratio, the method according to the invention provide using the correlation to predict the optimal salinity of a further member of the class of internal olefin sulfonate compositions, which further member contains a weight ratio of hydroxy alkane sulfonates to alkene sulfonates different from the reference members.

Alternatively, the correlation between the optimal salinity and the HAS/AS ratio may be used to predict the required weight ratio of hydroxy alkane sulfonates to alkene sulfonates of an individual member at which HAS/AS ratio the presence of the individual member in a mixture of the individual member, a brine and hydrocarbons, of which the salinity of the mixture is known, may result in a microemulsion with bicontinuous hydrocarbons and water phases.

The HAS/AS ratio herein is calculated on the basis of the weight ratio of the of hydroxy alkane sulfonate over alkene sulfonates in the internal olefin sulfonate composition. The internal olefin sulfonate compositions may also comprise low amounts of disulfonates. Disulfonates may be formed as a byproduct during the sulfonation of internal olefins.

Where disulfonates are present, a particularly suitable correlation may be a linear correlation characterized by a linear function:

$$OS=ax+cy+b, \quad (IV)$$

wherein:
OS=optimal salinity [wt % TDS or equivalent wt % NaCl];
x=weight ratio of hydroxy alkane sulfonates to alkene sulfonates feed [–];
y=disulfonate concentration [wt %, based on active matter];

−5<a<5, preferably −3<a<3, more preferably −2<a<2;
−7<b<7, preferably −5<b<5; and
−2<c<2, preferably 0<c<1, more preferably 0<c<0.5.

The coefficients a and c, herein, may be positive or negative depending on the nature of the internal olefin sulfonate composition, but are preferably not zero. Due to the relative hydrophilic nature of the disulfonates typically c is a positive value.

Active matter herein refers to the total of mono sulfonates, disulfonates and higher sulfonates in the internal olefin composition, irrespective of whether the mono-, di- or higher sulfonates of alkene sulfonates, hydroxy alkane sulfonates or other sulfonates.

The internal olefin sulfonate compositions may also comprise amounts of free oil, i.e. hydrocarbon compounds that do not contain sulfur atoms and/or an ionic headgroup. Free oil may be formed as a byproduct during the sulfonation of internal olefins. Where free oil is present, a particularly suitable correlation may be a linear correlation characterized by a linear function:

$$OS=ax+dz+b, \quad (V)$$

wherein:
OS=optimal salinity [wt % TDS or equivalent wt % NaCl];
x=weight ratio of hydroxy alkane sulfonates to alkene sulfonates feed [−];
z=free oil concentration [wt %, based on active matter];
−5<a<5, preferably −3<a<3, more preferably −2<a<2;
−7<b<7, preferably −5<b<5; and
−2<d<2, preferably −1<d<1, more preferably −0.5<d<0.5.

The coefficients a and d, herein, may be positive or negative depending on the nature of the internal olefin sulfonate composition, but are preferably not zero. Due to the relative hydrophobic nature of the free oil typically d is a negative value.

Active matter herein refers to the total of mono sulfonates, disulfonates and higher sulfonates in the internal olefin composition, irrespective of whether the mono-, di- or higher sulfonates are alkene sulfonates, hydroxy alkane sulfonates or other sulfonates.

Alternatively, the HAS/AS ratio may also be calculated on the basis of the weight ratio of the of hydroxy alkane sulfonate over the weight of the alkene sulfonates, disulfonates and the free oil combined.

Where disulfonates and free oil are present particularly suitable correlation may be a linear correlation characterized by a linear function:

$$OS=ax+cy+dz+b, \quad (VI)$$

wherein:
OS=optimal salinity [wt %]
x=weight ratio of hydroxy alkane sulfonates to alkene sulfonates feed [−]
y=disulfonate concentration [wt %, based on active matter];
z=free concentration [wt %, based on active matter];
−5<a<5, preferably −3<a<3, more preferably −2<a<2;
−7<b<7, preferably −5<b<5;
−2<c<2, preferably 0<c<1, more preferably 0<c<0.5; and
−2<d<2, preferably −1<d<1, more preferably −0.5<d<0.5.

The coefficients a, c and d, herein, may be positive or negative depending on the nature of the internal olefin sulfonate composition, but are preferably not zero. Due to the relative hydrophilic nature of the disulfonates typically c is a positive value. Due to the relative hydrophobic nature of the free oil typically d is a negative value.

Active matter herein refers to the total of mono sulfonates, disulfonates and higher sulfonates in the internal olefin composition, irrespective of whether the mono-, di- or higher sulfonates of alkene sulfonates, hydroxy alkane sulfonates or other sulfonates.

The hydroxy alkane sulfonate content and alkene sulphonate content in the internal olefin sulfonate composition may be determined by any suitable analytic method, preferably mass spectrometry.

The method according to the invention may also be used to determine the optimal salinity of an internal olefin for use in cEOR wherein in addition to the internal olefin sulfonate composition an additional compound such as a co-solvent or co-surfactant is provided, such as, but is not limited to, organic solvents, alkyl sulfonates, internal olefin sulfonates, aryl sulfonates or combinations thereof. Organic solvents include, but are not limited to, lower molecular weight alcohols, methyl ethyl ketone, acetone, lower alkyl cellosolves, lower alkyl carbitols or combinations thereof. Suitable low molecular weight alcohols for use as co-solvent in said hydrocarbon recovery composition include C1-C10 alkyl alcohols, more suitably C1-C8 alkyl alcohols, most suitably C1-C6 alkyl alcohols, or combinations thereof. Examples of suitable C1-C4 alkyl alcohols are methanol, ethanol, 1-propanol, 2-propanol (isopropyl alcohol), 1-butanol, 2-butanol (sec-butyl alcohol), 2-methyl-1-propanol (iso-butyl alcohol) and 2-methyl-2-propanol (tert-butyl alcohol). Examples of suitable C5 alkyl alcohols are 1-pentanol, 2-pentanol and 3-pentanol, and branched C5 alkyl alcohols, such as 2-methyl-2-butanol (tert-amyl alcohol). Examples of suitable C6 alkyl alcohols are 1-hexanol, 2-hexanol and 3-hexanol, and branched C6 alkyl alcohols. Further, organic solvents include compounds, which under the conditions in a hydrocarbon containing formation, may be converted into any of the above-mentioned co-solvents, such as one or more of the above-mentioned low molecular weight alcohols. Such precursor co-solvent compounds may include ether compounds, such as ethylene glycol monobutyl ether (EGBE), diethylene glycol monobutyl ether (DGBE) and triethylene glycol monobutyl ether (TGBE). The latter three ether compounds may be converted under the conditions in a hydrocarbon containing formation into ethanol and 1-butanol. Some of these compounds are formed during the reaction process, others may be added to improve the behavior of the composition in hydrocarbon containing formations which contain crude oil.

The internal olefin sulfonate composition may be prepared by an internal olefin sulfonation process. The method according to the present invention is particularly suitable for internal olefin sulfonate compositions that have been prepared with a falling film reactor-based based sulfonation process. Falling film reactor-based sulfonation processes are well known in the art, well know falling film process include Ballestra and Chemiton type falling film reactor-based sulfonation processes.

An internal olefin is an olefin whose double bond is located anywhere along the carbon chain except at a terminal carbon atom. A linear internal olefin does not have any alkyl, aryl, or alicyclic branching on any of the double bond carbon atoms or on any carbon atoms adjacent to the double bond carbon atoms. Typical commercial products produced by isomerization of alpha olefins are predominantly linear and contain a low average number of branches per molecule.

The internal olefins that are used to make the internal olefin sulfonate compositions of the present invention may be made by skeletal isomerization. Suitable processes for making the internal olefins include those described in U.S. Pat. Nos. 5,510,306, 5,633,422, 5,648,584, 5,648,585, 5,849,960, and European Patent EP 0830315 B1, all of which are herein incorporated by reference in their entirety. A hydrocarbon stream comprising at least one linear alpha-olefin is contacted with a suitable catalyst, such as the catalytic zeolites described in the aforementioned patents, in a vapor phase at a suitable reaction temperature, pressure, and space velocity. Generally, suitable reaction conditions include a temperature of about 200 to about 650° C., an olefin partial pressure of above about 0.5 atmosphere, and a total pressure of about 0.5 to about 10.0 atmospheres or higher. Preferably, the internal olefins of the present invention are made at a temperature in the range of from about 200 to about 500° C. at an olefin partial pressure of from about 0.5 to 2 atmospheres.

It is generally known that internal olefins are more difficult to sulfonate than alpha olefins (see "Tenside Detergents" 22 (1985) 4, pp. 193-195). In the article entitled "Why Internal Olefins are Difficult to Sulfonate," the authors state that by the sulfonation of various commercial and laboratory produced internal olefins using falling film reactors, internal olefins gave conversions of below 90 percent and further they state that it was found necessary to raise the $SO_3$:internal olefin mole ratio to over 1.6:1 in order to achieve conversions above 95 percent. Furthermore, there resulting products were very dark in color and had high levels of di- and poly-sulfonated products.

U.S. Pat. Nos. 4,183,867 and 4,248,793, which are herein incorporated by reference, disclose processes which can be used to make the branched internal olefin sulfonate compositions.

The processes may be carried out in a falling film reactor for the preparation of light color internal olefin sulfonates. The amounts of unreacted internal olefins are between 10 and 20 percent and at least 20 percent, respectively, in the processes and special measures must be taken to remove the unreacted internal olefins. The internal olefin sulfonate compositions containing between 10 and 20 percent and at least 20 percent, respectively, of unreacted internal olefins must be purified before being used. Consequently, the preparation of internal olefin sulfonate compositions having the desired light color and with the desired low free oil content offer substantial difficulty.

Such difficulties can be avoided by following the process disclosed in European Patent EP 0351928 B1, which is herein incorporated by reference.

A process which can be used to make internal olefin sulfonate compositions for use in the present invention comprises reacting in a film reactor an internal olefin as described above with a sulfonating agent in a mole ratio of sulfonating agent to internal olefin of 1:1 to 1.5:1 while cooling the reactor with a cooling means having a temperature not exceeding 60° C., directly neutralizing the obtained reaction product of the sulfonating step and, without extracting the unreacted internal olefin, hydrolyzing the neutralized reaction product.

In the preparation of the sulfonates derived from internal olefins, the internal olefins are reacted with a sulfonating agent, which may be sulfur trioxide, sulfuric acid, or oleum, with the formation of beta-sultone and some alkane sulfonic acids. The film reactor is preferably a falling film reactor.

The reaction products are neutralized and hydrolyzed. Under certain circumstances, for instance, aging, the beta-sultones are converted into gamma-sultones which may be converted into delta-sultones. After neutralization and hydrolysis, gamma-hydroxy alkane sulfonates and delta-hydroxy alkane sulfonates are obtained. A disadvantage of these two sultones is that they are more difficult to hydrolyze than beta-sultones. Thus, in most embodiments it is preferable to proceed without aging. The beta sultones, after hydrolysis, give beta-hydroxy alkane sulfonates.

The cooling means, which is preferably water, has a temperature not exceeding 60° C., especially a temperature in the range of from 0 to 50° C. Depending upon the circumstances, lower temperatures may be used as well. The reaction mixture is then fed to a neutralization hydrolysis unit. The neutralization/hydrolysis is carried out with a water soluble base, such as sodium hydroxide or sodium carbonate. The corresponding bases derived from potassium or ammonium are also suitable. The neutralization of the reaction product from the falling film reactor is generally carried out with excessive base, calculated on the acid component. Generally, neutralization is carried out at a temperature in the range of from 0 to 80° C. Hydrolysis may be carried out at a temperature in the range of from 100 to 250° C., preferably 130 to 200° C. The hydrolysis time generally may be from 5 minutes to 4 hours. Alkaline hydrolysis may be carried out with hydroxides, carbonates, bicarbonates of (earth) alkali metals, and amine compounds.

This process may be carried out batchwise, semi-continuously, or continuously. The reaction is generally performed in a falling film reactor which is cooled by flowing a cooling means at the outside walls of the reactor. At the inner walls of the reactor, the internal olefin flows in a downward direction and is contacted with the sulfonation agent, preferably sulfur trioxide. Sulfur trioxide is diluted with a stream of nitrogen, air, or any other inert gas into the reactor. The concentration of sulfur trioxide generally is between 2 and 5 percent by volume based on the volume of the carrier gas. In the preparation of internal olefin sulfonate compositions derived from the olefins of the present invention, it is required that in the neutralization hydrolysis step very intimate mixing of the reactor product and the aqueous base is achieved. This can be done, for example, by efficient stirring or the addition of a polar co-solvent (such as a lower alcohol) or by the addition of a phase transfer agent.

As mentioned above, the individual members of a class of internal olefin sulfonates compositions have different HAS/AS ratios. The HAS/AS ratio of the prepared internal olefin sulfonate compositions may be varied by preparing the individual members of the class of internal olefin sulfonate compositions at different sulfonation conditions. The hydroxy alkane sulfonates and alkene sulfonates compounds may be related directly to the product yield from sulfonation, neutralization and hydrolysis conditions and thus may be controlled by changing these condition. In particular, the temperature at which the sulfonating agent is contacted with the internal olefin and the contact time between the internal olefin and the sulfonating agent may be varied to improve the weight ratio of hydroxy alkane sulfonates to alkene sulfonates. Other process parameters that may be varied including the ageing time, internal olefin film thickness, $SO_3$ flow rates, internal olefin flow rate, $SO_3$ to $N_2$ dilution ratio. An extensive description of the effect of changing sulfonation parameters on the resulting sulfonate is provided in H. Stache, Anionic Surfactants—Organic Chemistry. Surfactant Science Series, Volume 56: Marcel Dekker, New York, 1995, in particular Chapter 7, Olefinsulfonates, pages 363 to 459. Authors: J. K. Borchardt, E. L Berryman, F. W. Heywood, N. M. Van Os, R. van Ginkel, A. von Zon, which is herein incorporated by reference.

Following, the preparation of the internal olefin sulfonate composition, the weight ratio of hydroxy alkane sulfonates to alkene sulfonates in the internal olefin sulfonate composition may be determined via Mass Spectrometry.

Following the preparation, the internal olefin sulfonate composition is typically stored and transported from the point of manufacture to the location of the hydrocarbon containing formation.

In a further aspect the invention provides for the use of the weight ratio of hydroxy alkane sulfonates to alkene sulfonates in an internal olefin sulfonate composition to predict the optimal salinity of the surfactant composition in a mixture of the surfactant composition, a brine and an oil.

EXAMPLES

Example 1A

Several samples of an internal olefin feedstock (ENORDET O241 ex Shell Chemicals) comprising of a mixture of internal olefins having an average carbon number of from about 20.0 to about 23 were sulfonated in a falling film sulfonation reactor. The sulfonation conditions were the same for all samples with the exception of the sulfonation temperature and the aging time. Samples with varying the active matter content were produced. The produced internal olefin sulfonate composition could be characterized as $C_{20-24}$ internal olefin sulfonate, as defined hereinabove.

The produced $C_{20-24}$ internal olefin sulfonate samples were analyzed by mass spectrometry to determine the molecular composition. The molecular composition is shown in Table 1.

For each of the samples the optimal salinity was determined for a mixture of the internal olefin sulfonate composition sample, an aqueous NaCl brine and octane as a model oil and at a temperature of 90° C. The $C_{20-24}$ internal olefin sulfonate was added in an active matter concentration of 2 wt % based on the brine. In this example, optimal salinity is expressed in wt % TDS. The amount of NaCl that was added to the brine was varied to adjust the salinity of the brine. Equal volumes of brine and octane were provided. The optimal salinity was determined by observing the phase behavior of the mixture at different brine salinities. The optimal salinity was the salinity at which the formation of a Winsor type III microemulsion was observed. The optimal salinity is determined by measuring the volumes of water, oil and any emulsion phases at a particular test temperature as salinity is increased causing a transition in phase behavior from Winsor type I to type III to type II. The data from these phases are plotted against salinity and give oil and water solubilisation parameters. This method for determining the optimal salinity is also referred to as the static method for determining the optimal salinity. The obtained optimal salinities are shown in Table 1.

The obtained HAS/AS ratio and optimal salinity for the separate samples were used to determine the correlation between the optimal salinity and the HAS/AS ratio of the $C_{20-24}$ internal olefin sulfonate. FIG. 1 shows a plot of the obtained HAS/AS ratio versus the obtained optimal salinity for octane. It is clear from the plot in FIG. 1 that a linear correlation exits between the obtained HAS/AS ratio and optimal salinity for the $C_{20-24}$ internal olefin sulfonate reference samples, where the hydrocarbons, i.e. the oil, is octane. On the basis of the plot in FIG. 1 the following linear correlation function could be determined:

$$OS=-0.448x+3.58 \tag{VII}$$

Example 1B

For four of the samples as provided in Example 1A, the optimal salinity was determined for a mixture of the internal olefin sulfonate composition sample, an aqueous brine and a crude oil and at a temperature of 52° C. The aqueous brine contained 1 wt % of $Na_2CO_3$ and a variable amount of NaCl was added to adjust the salinity of the brine. In this example, optimal salinity is expressed in wt % TDS. Different from Example 1A, the optimal salinity was determined using a dynamic test method, also referred to as 'Dynamic Tilting Test' or 'Tube Tilting Test'. In this test method the static test as used for Example 1 is followed by low-energetic mixing of the equilibrated phases by gently swaying the test tube and its contents. The emulsions that are formed in this dynamic system are assessed. The individual tubes are gently tilted to an angle of about 90° to examine the degree of emulsion formation and tilted between 0 and 180° to examine the emulsion characteristics of the total tube content. From the combined observations the phase behavior, i.e. from Winsor type I to type III to type II, is determined.

The $C_{20-24}$ internal olefin sulfonate was added in an active matter concentration of 0.5 wt % based on the brine. The brine further contained 0.5 wt % of sec-butyl alcohol, based on the brine, as a co-solvent.

Equal volumes of brine and crude oil were provided. The obtained optimal salinities are shown in Table 1.

Figure 2:
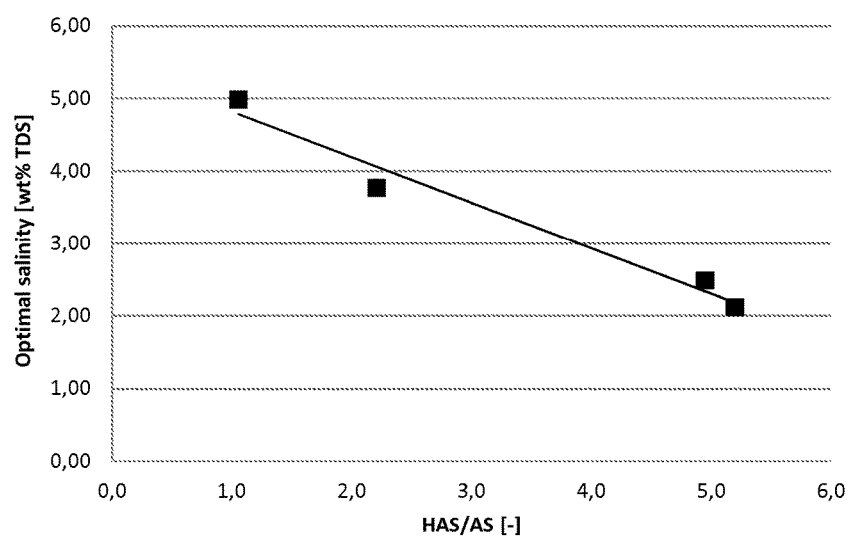
FIG. 2 depicts a graphical representation of the correlation between the optimal salinity and HAS/AS for $C_{20-24}$ internal olefin sulfonates, wherein the hydrocarbons are provided in the form of a crude oil.

The obtained HAS/AS ratio and optimal salinity for the separate samples were used to determine the correlation between the optimal salinity and the HAS/AS ratio of the $C_{20-24}$ internal olefin sulfonate. FIG. 2 shows a plot of the obtained HAS/AS ratio versus the obtained optimal salinity. It is clear from the plot in FIG. 2 that a linear correlation exits between the obtained HAS/AS ratio and optimal salinity for the $C_{20-24}$ internal olefin sulfonate reference samples, i.e. the oil, is crude oil. On the basis of the plot in FIG. 2 the following linear correlation function could be determined:

$$OS=-0.629x+5.45 \tag{VIII}$$

Example 2A

Following a similar procedure as used in Example 1A the HAS/AS ratio and optimal salinity were determined for samples of internal olefin sulfonate compositions prepared by sulfonating an internal olefin feedstock (ENORDET O351 ex Shell Chemicals LP) comprising of a mixture of internal olefins having an average carbon number of from about 24.5 to about 29. The produced internal olefin sulfonate composition could be characterized as $C_{24-28}$ internal olefin sulfonate, as defined hereinabove.

The optimal salinity was determined using a NaCl containing brine in the same way as described in Example 1A. In this example, optimal salinity was expressed in wt % TDS. The amount of NaCl that was added to the brine was varied to adjust the salinity of the brine.

In Example 2A, the optimal salinity of the obtained reference samples was determined in the presence of a co-surfactant ENORDET O332 (ex Shell Chemicals). The weight ratio of internal olefin sulfonate composition to ENORDET O332 was 5:2. For all samples the same co-surfactant was added. The co-sufactant was not included in the HAS/AS ratio. The HAS/AS ratio was based only on the HAS/AS ratio of the $C_{24-28}$ internal olefin sulfonate.

The $C_{24-28}$ internal olefin sulfonate was added in an active matter concentration of 1 wt % based on the brine. Equal volumes of brine and octane were provided.

The brine further contained 1 wt % of isobutyl alcohol, based on the brine, as a co-solvent.

In addition to the HAS/AS ratio and the optimal salinity also the disulfonate content and free oil content were determined.

Figure 3:
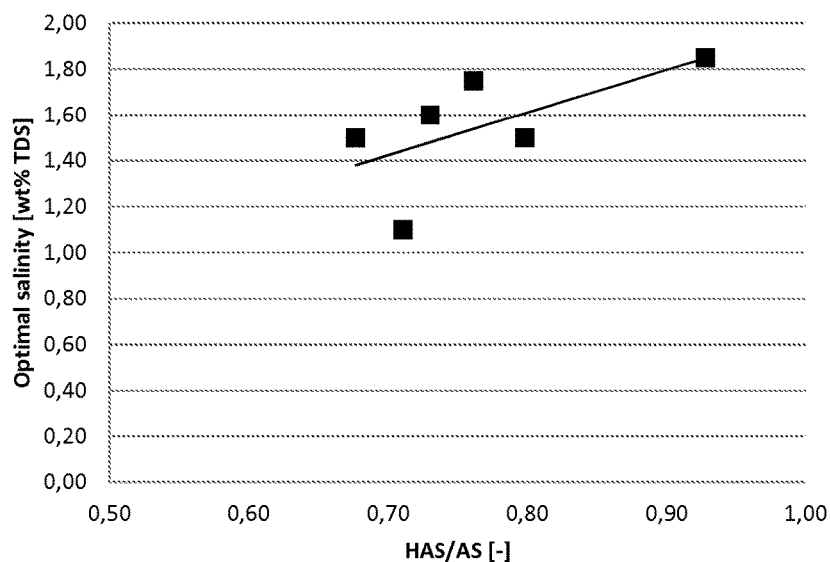
FIG. 3 depicts a graphical representation of the correlation between the optimal salinity and HAS/AS for $C_{24-28}$ internal olefin sulfonates, wherein the hydrocarbons are provided in the form of octane.

The obtained HAS/AS ratio, disulfonate content, free oil content and optimal salinity for the separate samples are shown in Table 2 and were used to determine the correlation between the optimal salinity and the HAS/AS ratio of the $C_{24-28}$ internal olefin sulfonate. FIG. 3 shows a plot of the obtained HAS/AS ratio versus the obtained optimal salinity. It is clear from the plot in FIG. 3 that a linear correlation exits between the obtained HAS/AS ratio and optimal salinity for the $C_{24-28}$ internal olefin sulfonate reference samples. On the basis of the plot in FIG. 3 the following linear correlation function could be determined:

$$OS=1.86x+0.120 \tag{IX}$$

By including the data obtained for the free oil and disulfonate content an improved linear correlation function could be determined:

$$OS=1.70x+0.089y-0.026z \tag{X}$$

Figure 4:
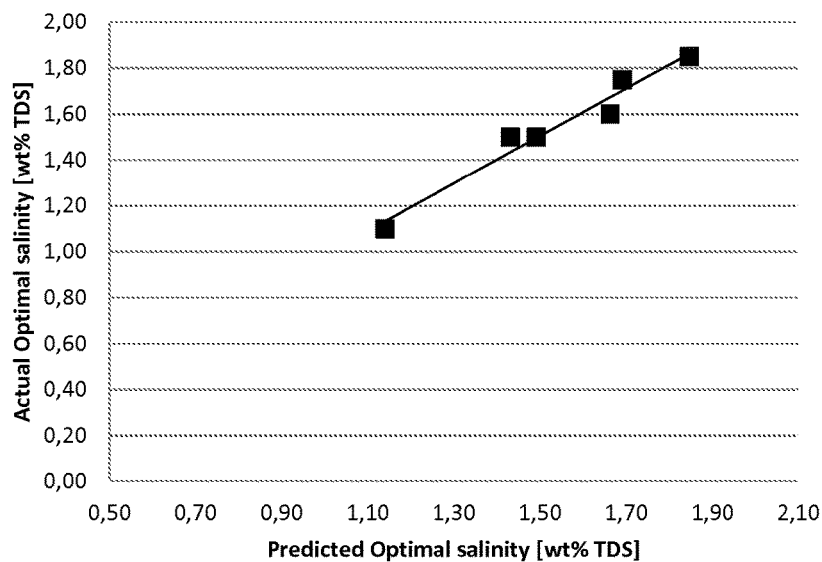
FIG. 4 depicts a graphical representation of the actual optimal salinity versus the predicted optimal salinity using the correlation according to the invention for $C_{24-28}$ internal olefin sulfonates, wherein the hydrocarbons are provided in the form of octane.

As can be seen from FIG. 4, where for the mixture comprising the octane the measured optimal salinity is plotted versus the optimal salinity predicted by correlation (X), correlation (X) provides an accurate prediction of the actual optimal salinity of the internal olefin sulfonate composition.

Example 2B

For the same samples as provided in Example 2A, the optimal salinity was determined for a mixture of the internal olefin sulfonate composition sample, an aqueous brine and a crude oil and at a temperature of 83° C. The aqueous brine contained 2 wt % of $Na_2CO_3$ and a variable amount of NaCl was added to adjust the salinity of the brine. Optimal salinity is expressed in wt % TDS. The optimal salinity was determined in the same way as described in Example 1B. The $C_{20-24}$ internal olefin sulfonate was added in an active matter concentration of 0.7 wt % based on the brine. Equal volumes of brine and crude oil were provided. The obtained optimal salinities are shown in Table 2.

The brine further contained 2 wt % of isobutyl alcohol, based on the brine, as a co-solvent.

In addition to the HAS/AS ratio and the optimal salinity also the disulfonate content and free oil content were determined.

In Example 2B, the optimal salinity of the obtained reference samples was determined in the presence of a co-surfactant ENORDET O332 (ex Shell Chemicals). The weight ratio of internal olefin sulfonate composition to ENORDET O332 was 5:2. For all samples the same co-surfactant was added. The co-surfactant was not included in the HAS/AS ratio. The HAS/AS ratio was based only on the HAS/AS ratio of the $C_{24-28}$ internal olefin sulfonate.

The obtained HAS/AS ratio, disulfonate content, free oil content and optimal salinity for the separate samples are shown in Table 2 and were used to determine the correlation between the optimal salinity and the HAS/AS ratio of the $C_{24-28}$ internal olefin sulfonate. FIG. 5 shows a plot of the obtained HAS/AS ratio versus the obtained optimal salinity. It is clear from the plot in FIG. 5 that a linear correlation exits between the obtained HAS/AS ratio and optimal salinity for the $C_{24-28}$ internal olefin sulfonate reference samples. On the basis of the plot in FIG. 5 the following linear correlation function could be determined:

$$OS=4.10x-1.73 \tag{XI}$$

By including the data obtained for the free oil and disulfonate content an improved linear correlation function could be determined:

$$OS=2.65x+0.088y-0.057z+2 \tag{XII}$$

As can be seen from FIG. 6, where for the mixture comprising the crude the measured optimal salinity is plotted versus the optimal salinity predicted by correlation (XII), correlation (XII) provides an accurate prediction of the actual optimal salinity of the internal olefin sulfonate composition.

TABLE 1

| Sample # | 1 | 2 | 3 | 4 | 5 | 6 |
|---|---|---|---|---|---|---|
| Process conditions: | | | | | | |
| Sulfonation temperature [° C.] | 30 | 50 | 30 | 30 | 50 | 30 |
| Aging [minutes] | no | no | 72 | no | no | 72 |
| Active matter [wt %] | 37 | 36 | 40 | 75 | 74 | 71 |
| Results: | | | | | | |
| hydroxy alkane sulfonate [wt %]* | 81.4 | 66.0 | 49.2 | 83.1 | 74.5 | 56.3 |
| alkene sulfonate [wt %]* | 16.1 | 29.6 | 46.2 | 15.2 | 23.0 | 41.4 |
| hydroxy olefin sulfonate [wt %]* | 0.5 | 0.6 | 0.2 | 0.3 | 0.4 | 0.1 |
| di-alkene sulfonate [wt %]* | 0.5 | 0.6 | 0.6 | 0.9 | 0.9 | 0.8 |
| HAS/AS | 4.9 | 2.2 | 1.1 | 5.2 | 3.1 | 1.3 |
| Optimal salinity with octane [wt % TDS] | 1.55 | 2.40 | 3.30 | 1.30 | 1.80 | 3.10 |
| Optimal salinity with crude [wt % TDS] | 2.49 | 3.77 | 4.99 | 2.12 | — | — |

*wt % based on active matter content

TABLE 2

| Sample # | 1 | 2 | 3 | 4 | 5 | 6 |
|---|---|---|---|---|---|---|
| Active matter [wt %] | 63 | 66 | 63 | 60 | 66 | 36 |
| Results: | | | | | | |
| hydroxy alkane sulfonate [wt %]* | 38.0 | 37.3 | 38.0 | 34.9 | 35.2 | 38.3 |
| alkene sulfonate [wt %]* | 42.9 | 40.9 | 45.2 | 43.3 | 41.7 | 43.5 |
| hydroxy olefin sulfonate [wt %]* | 3.2 | 0.8 | 0.2 | 0.7 | 2.1 | 5.7 |
| di-alkene sulfonate [wt %]* | 8.7 | 9.2 | 8.5 | 9.3 | 9.4 | 3.9 |
| Disulfonate [wt %]* | 7.1 | 11.8 | 8.0 | 11.9 | 11.6 | 8.7 |
| Free oil [wt %]* | 22.3 | 26.0 | 31.1 | 28.5 | 24.4 | 20.4 |
| HAS/AS [-] | 0.80 | 0.76 | 0.71 | 0.68 | 0.73 | 0.93 |

TABLE 2-continued

| Sample # | 1 | 2 | 3 | 4 | 5 | 6 |
|---|---|---|---|---|---|---|
| Optimal salinity with octane [wt % TDS] | 1.50 | 1.75 | 1.10 | 1.50 | 1.60 | 1.85 |
| Optimal salinity with crude [wt % TDS] | 3.20 | 3.53 | 2.88 | 3.33 | 3.31 | 4.21 |

*wt % based on active matter content

That which is claimed is:

1. A method for predicting the optimal salinity of individual members of a class of internal olefin sulfonate compositions in a mixture containing the individual member, a brine and hydrocarbons, wherein the internal olefin sulfonate compositions comprise a mixture containing hydroxy alkane sulfonates and alkene sulfonates, the method including:
    (a) determining the correlation between a weight ratio of hydroxy alkane sulfonates to alkene sulfonates of the individual members and separately the optimal salinity of individual members in a mixture containing the individual member, the brine and the hydrocarbons on the basis of two or more reference members of the class of internal olefin sulfonate compositions, each reference member having a different known weight ratio of hydroxy alkane sulfonates to alkene sulfonates; and
    (b) using the correlation to predict:
        b1) the optimal salinity of a further member of the class of internal olefin sulfonate compositions, which further member contains a weight ratio of hydroxy alkane sulfonates to alkene sulfonates different from the reference members; or
        b2) the required weight ratio of hydroxy alkane sulfonates to alkene sulfonates of an individual member at which weight ratio of hydroxy alkane sulfonates to alkene sulfonates the presence of the individual member in a mixture containing the individual member, the brine and hydrocarbons, of which the salinity of the mixture is known, may result in a microemulsion with bicontinuous hydrocarbons and water phases,
    wherein the correlation is characterized by a function:

$$OS = f(x), \quad (I)$$

wherein:
        OS=optimal salinity [wt % TDS (total dissolved solids) or equivalent wt % NaCl]; and
        x=weight ratio of hydroxy alkane sulfonates to alkene sulfonates [−].

2. A method according to claim 1, wherein in step (a) comprises:
    i) preparing a first reference member with a first weight ratio of hydroxy alkane sulfonates to alkene sulfonates;
    ii) determining an optimal salinity of the first reference member in a first mixture containing the first reference member, a first brine and the oil by changing the salinity of the first brine;
    iii) preparing a second reference member with a second weight ratio of hydroxy alkane sulfonates to alkene sulfonates, which second weight ratio is different from the first weight ratio of hydroxy alkane sulfonates to alkene sulfonates;
    iv) determining an optimal salinity of the second reference member in a second mixture containing the second reference member, a second brine and the oil by changing the salinity of the second brine; and
    v) correlating the optimal salinities of the first and second reference members to the first and second weight ratio of hydroxy alkane sulfonates to alkene sulfonates.

3. A method according to claim 2, wherein steps (iii) and (iv) are repeated one or more times using further reference members with different further weight ratios of hydroxy alkane sulfonates, and using the optimal salinities of the further reference members and the further weight ratios of hydroxy alkane sulfonates to alkene sulfonates in step (v).

4. A method according to claim 1, wherein the class of internal olefin sulfonate compositions comprises individually members, which members are internal olefin sulfonate compositions having different weight ratios of hydroxy alkane sulfonates to alkene sulfonates, and which internal olefin sulfonate compositions have been prepared from the same internal olefin comprising feedstock.

5. A method according to claim 1, wherein the class of internal olefin sulfonate compositions comprises individually members, which members are internal olefin sulfonate compositions having different weight ratios of hydroxy alkane sulfonates to alkene sulfonates, and which members have been prepared from two or more internal olefin comprising feedstocks, and wherein:
    each of the two or more internal olefin comprising feedstocks comprises a mixture of internal olefins; and
    the difference between the average carbon number of the internal olefins calculated on the basis of all of the two or more internal olefin feedstocks and the average carbon number of the internal olefins of each individual internal olefin comprising feedstock is not more than 2.

6. A method according to claim 1, wherein the class of internal olefin sulfonate compositions comprises individually members, which members are internal olefin sulfonate compositions having different weight ratios of hydroxy alkane sulfonates to alkene sulfonates, and which members have been prepared from two or more internal olefin comprising feedstocks, and wherein:
    each of the two or more internal olefin comprising feedstocks comprises a mixture of internal olefins including branched internal olefins; and
    the overall average content of branched olefins, calculated on the basis of all of the two or more internal olefin feedstocks and the average content of branched olefins of each individual internal olefin comprising feedstock, calculated on the basis of the individual internal olefin feedstock, do not differ by more than 40 wt %.

7. A method according to claim 1, wherein the internal olefin sulfonate composition are produced using a falling film reactor-based process.

8. A method according to claim 1, wherein the individual members of the class of internal olefin sulfonate compositions have been prepared at different sulfonation conditions.

9. A method according to claim 8, wherein the sulfonation conditions include one or more of the sulfonation conditions of the group consisting of the sulfonation temperature and the ageing time, internal olefin film thickness, $SO_3$ flow rates, internal olefin flow rate, $SO_3$ to $N_2$ dilution ratio.

10. A method according to claim 1, wherein the correlation is a linear correlation characterized by a linear function:

$$OS = ax + b,$$

wherein:
        OS=optimal salinity [wt % TDS or equivalent wt % NaCl];

x=weight ratio of hydroxy alkane sulfonates to alkene sulfonates feed [–];

−5<a<5; and

−7<b<7, preferably −5<b<5.

11. A method according to claim 1, wherein the class of internal olefin sulfonate compositions comprises individually members, which members are internal olefin sulfonate compositions comprising a mixture of internal olefin sulfonates wherein the mixture has an average carbon number in the range of from 12 to 32.

12. A method according to claim 1, wherein the class of internal olefin sulfonate compositions comprises individually members, which members are internal olefin sulfonate compositions comprising a mixture of internal olefin sulfonates wherein the mixture has an average carbon number in the range of from 19.5 to 23.

13. A method according to claim 1, wherein the class of internal olefin sulfonate compositions comprises individually members, which members are internal olefin sulfonate compositions comprising a mixture of internal olefin sulfonates wherein the mixture has an average carbon number in the range of from 20.0 to 23.

14. A method according to claim 1, wherein the class of internal olefin sulfonate compositions comprises individually members, which members are internal olefin sulfonate compositions comprising a mixture of internal olefin sulfonates wherein the mixture has an average carbon number in the range of from 24.5 to 29.

15. A method according to claim 1, wherein the correlation is linear, exponential or logarithmic.

* * * * *